(12) United States Patent
Shimizu et al.

(10) Patent No.: US 11,408,492 B2
(45) Date of Patent: Aug. 9, 2022

(54) ELECTRIC ACTUATOR

(71) Applicant: NTN Corporation, Osaka (JP)

(72) Inventors: Tatsunori Shimizu, Shizuoka (JP);
Shinsuke Hirano, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/251,456

(22) PCT Filed: Jun. 25, 2019

(86) PCT No.: PCT/JP2019/025124
§ 371 (c)(1),
(2) Date: Dec. 11, 2020

(87) PCT Pub. No.: WO2020/004379
PCT Pub. Date: Jan. 2, 2020

(65) Prior Publication Data
US 2021/0246973 A1 Aug. 12, 2021

(30) Foreign Application Priority Data

Jun. 29, 2018 (JP) .............................. JP2018-124586

(51) Int. Cl.
*F16H 57/04* (2010.01)
*F16H 25/20* (2006.01)
(Continued)

(52) U.S. Cl.
CPC .............. *F16H 25/20* (2013.01); *F16H 57/02* (2013.01); *F16H 57/029* (2013.01);
(Continued)

(58) Field of Classification Search
CPC ..... F16H 2025/2081; F16H 2025/2031; F16H 2057/02034; F16H 57/0416; F16H 57/029;
(Continued)

(56) References Cited

U.S. PATENT DOCUMENTS 4,747,319 A * 5/1988 Sakuta .................. B62D 33/07
74/411.5
2019/0264788 A1 8/2019 Shimizu

FOREIGN PATENT DOCUMENTS

| JP | 2013-234735 | 11/2013 |
| JP | 2013234735 A * | 11/2013 |
| JP | 2018-74791 | 5/2018 |

OTHER PUBLICATIONS

International Search Report dated Aug. 6, 2019 in International (PCT) Application No. PCT/JP2019/025124.
(Continued)

*Primary Examiner* — Randell J Krug
(74) *Attorney, Agent, or Firm* — Wenderoth, Lind & Ponack, L.L.P.

(57) ABSTRACT

An electric actuator 1 includes a drive unit 2, a driving force transmission mechanism 3, a motion conversion mechanism 4, an accommodation space accommodating the drive unit 2, the driving force transmission mechanism 3, and the motion conversion mechanism 4, and a ventilation section 5. The ventilation section 5 includes a vent 53 penetrating a partition wall partitioning the driving force transmission mechanism 3, an air flow path 46 communicating with the vent 53, and a filter 60.

7 Claims, 5 Drawing Sheets

(51) Int. Cl.
  *F16H 57/02*    (2012.01)
  *F16H 57/029*   (2012.01)
(52) U.S. Cl.
  CPC ..... *F16H 57/0416* (2013.01); *F16H 57/0476* (2013.01); *F16H 2025/2031* (2013.01); *F16H 2025/2081* (2013.01); *F16H 2057/02034* (2013.01); *F16H 2057/02069* (2013.01)
(58) Field of Classification Search
  CPC .... F16H 57/02; F16H 57/027; F16H 57/0454; F16H 2700/00; B25J 19/0054
  See application file for complete search history.

(56) References Cited

OTHER PUBLICATIONS

International Preliminary Report on Patentability and Written Opinion of the International Searching Authority dated Dec. 29, 2020 in International (PCT) Application No. PCT/JP2019/025124.

\* cited by examiner

ELECTRIC ACTUATOR

TECHNICAL FIELD

The present invention relates to an electric actuator.

BACKGROUND ART

In recent years, motorization has progressed in order to save labor and reduce fuel consumption of vehicles. For example, a system for operating an automatic transmission, a brake, a steering wheel, and the like of an automobile by power of a motor has been developed and released on the market. There is known, as an actuator used for such an application, an electric actuator using a ball screw mechanism that converts a rotary motion generated by driving a motor into a linear motion.

For example, Patent Literature 1 discloses an electric actuator including a drive unit (motor section) including an electric motor, a motion conversion mechanism including a ball screw mechanism, and a gear mechanism transmitting a driving force from the drive unit to the ball screw mechanism.

The drive unit, the motion conversion mechanism, and the gear mechanism are accommodated in an outer case. The outer case includes a motor case accommodating the electric motor of the drive unit, and an actuator case and a shaft case accommodating the motion conversion mechanism and the gear mechanism.

A boot is provided on a screw shaft of the ball screw mechanism to prevent foreign matter from entering. The boot is configured in bellows capable of expanding and contracting in accordance with a movement of the screw shaft. Further, the boot is accommodated in a cylindrical boot cover integrally formed with the motor case. The screw shaft is accommodated in a space configured by the boot, the boot cover, and the shaft case.

The electric actuator has a closed space inside accommodating the electric motor, the gear mechanism, and the ball screw mechanism by connecting elements such as the motor case, the actuator case, the shaft case, the boot, and the boot cover via a means such as a sealing member (O-ring).

CITATIONS LIST

Patent Literature

Patent Literature 1: JP 2018-74791 A

SUMMARY OF INVENTION

Technical Problems

In the known electric actuator, when the screw shaft of the ball screw mechanism moves, a pressure difference is generated in the closed space. That is, in response to an extension of the boot when the screw shaft moves forward from a standby position, a negative pressure is generated in the internal space of the electric actuator. Further, in response to a contraction of the boot by the screw shaft moving backward, a positive pressure is generated in the internal space of the electric actuator.

When such a pressure difference occurs, the boot may be dented due to the negative pressure during the extension, or the boot may be overloaded due to the positive pressure during the contraction, which may reduce durability of the boot. Such a decrease in the durability becomes more remarkable for securing a long stroke of the screw shaft, thereby limiting a degree of freedom in designing the electric actuator.

The present invention has been made in view of the above circumstances, and an object of the present invention is to provide an electric actuator capable of adjusting an internal pressure.

Solutions to Problems

The present invention is for solving the above problems, and is an electric actuator including a drive unit having an output shaft that is rotatable, a motion conversion mechanism configured to convert a rotary motion of the output shaft into a linear motion, a driving force transmission mechanism configured to transmit a driving force of the drive unit to the motion conversion mechanism, an accommodation space accommodating the drive unit, the motion conversion mechanism, and the driving force transmission mechanism, and a ventilation section configured to ventilate the accommodation space in accordance with an operation of the motion conversion mechanism, in which the ventilation section includes a vent penetrating a partition wall partitioning the driving force transmission mechanism, an air flow path communicating with the vent, and a filter.

This configuration enables the electric actuator to adjust a pressure in the accommodation space by communicating air through the ventilation section even when the motion conversion mechanism operates. Further, the ventilation section, which is provided with a filter, can prevent foreign matter from entering the electric actuator.

The electric actuator having the above configuration preferably includes a first case accommodating the driving force transmission mechanism and having the partition wall and the vent, and a second case holding the filter, in which the first case and the second case are overlapped and connected, and the air flow path is disposed between the first case and the second case.

With such a configuration, a vent is formed in the first case, a filter is disposed in the second case, and an air flow path is formed between the first case and the second case, thereby arranging the vent and the filter apart from each other by an air flow path. Thus, for example, foreign matter such as oil included in the air discharged from the vent can be left in the air flow path to prevent the foreign matter from adhering to the filter.

Further, the motion conversion mechanism may include a screw shaft capable of linear motion and a boot configured to expand and contract in response to a movement of the screw shaft, the second case may be a shaft case accommodating the screw shaft, the shaft case may include a base and a shaft accommodation part accommodating the screw shaft, and the filter may be disposed at the base at a position apart from the shaft accommodation part.

This configuration allows the filter to be disposed at a position as far as possible from the screw shaft. Thus, even when the lubricant (grease or oil) or the like used for the screw shaft is scattered, the splashed lubricant can be prevented from adhering to the filter.

In the electric actuator having the above configuration, the air flow path may include a plurality of recesses disposed in at least one of the first case or the second case. Thus, the air flow path can secure a sufficient flow path sectional area for circulating the air.

Further, the vent can be on a bottom surface of the recesses disposed in the first case. Thus, the vent and the air flow path can be easily communicated with each other.

In the electric actuator having the above configuration, the motion conversion mechanism may include a labyrinth seal part communicating with the ventilation section. This can prevent the splashed lubricant used in the motion conversion mechanism from flowing into the ventilation section.

Advantageous Effects of Invention

The present invention can suitably adjust the internal pressure of the electric actuator.

DESCRIPTION OF EMBODIMENTS

Hereinafter, an embodiment for implementing the present invention will be described with reference to the drawings. FIGS. 1 to 6 show one embodiment of an electric actuator according to the present invention.

Figure 1:
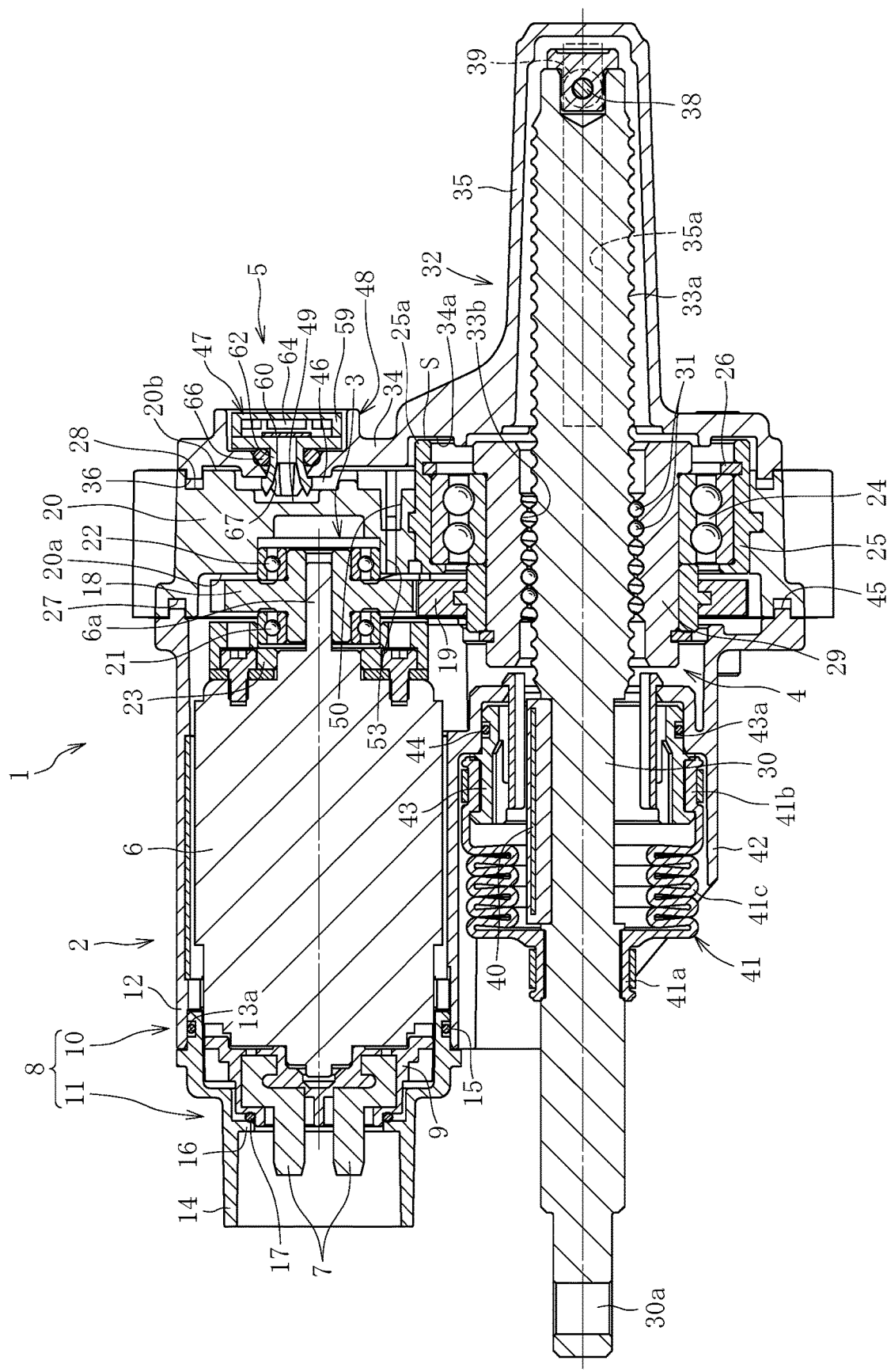
FIG. 1 is a vertical sectional view of an electric actuator according to one embodiment of the present invention.
Figure 2:
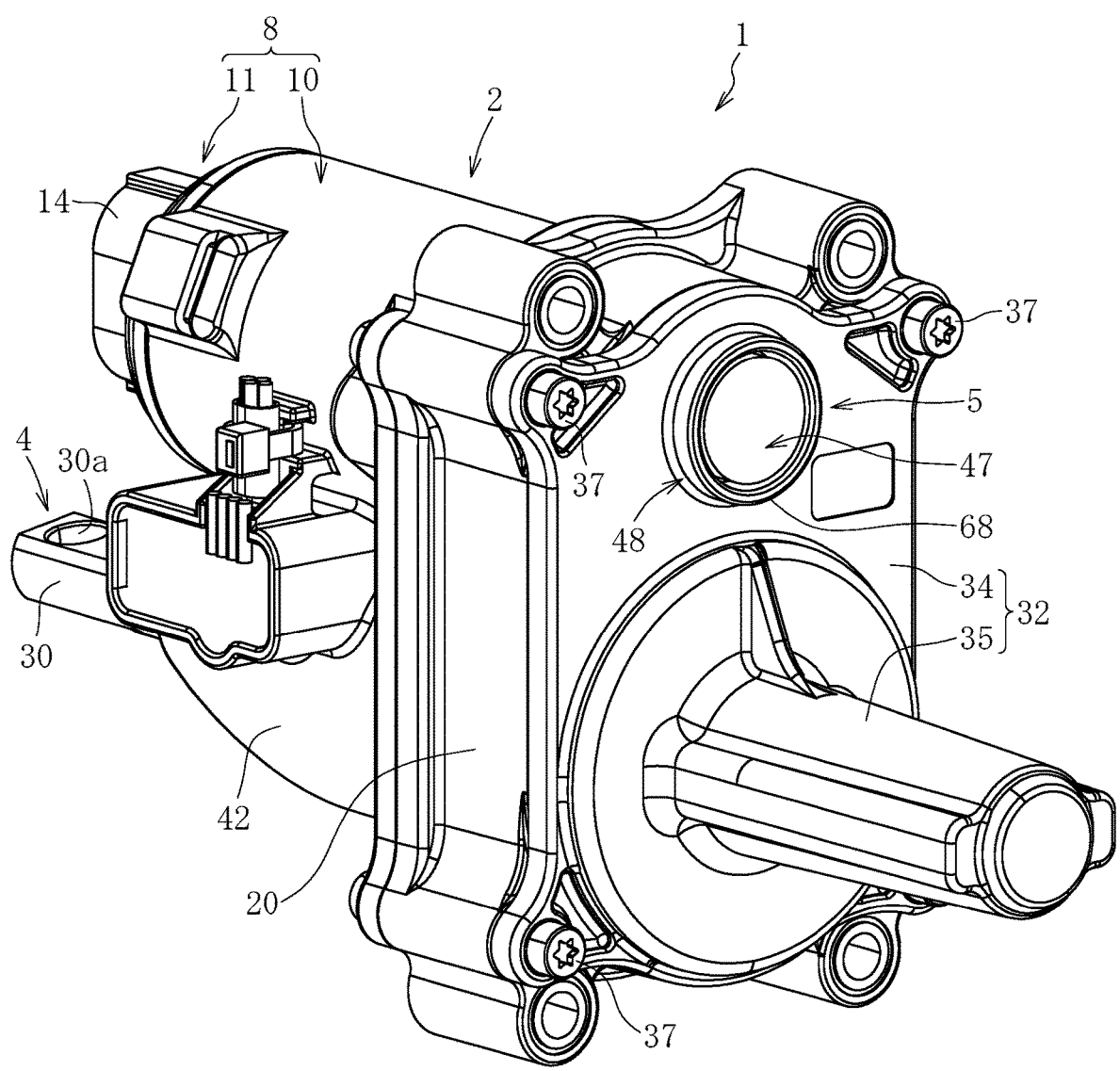
FIG. 2 is a perspective view of the electric actuator.

As shown in FIGS. 1 and 2, an electric actuator 1 mainly includes a drive unit 2, a driving force transmission mechanism 3, a motion conversion mechanism 4, and a ventilation section 5.

The drive unit 2 includes an electric motor 6 having a rotatable output shaft 6a, a pair of bus bars 7 as conductive members supplying electric power to the electric motor 6, and a motor case 8 accommodating the electric motor 6, the bus bars 7, and the like.

The electric motor 6 is accommodated in the motor case 8 such that the output shaft 6a protrudes horizontally toward the driving force transmission mechanism 3. The bus bars 7 are supported by a holder 9 in the motor case 8.

The motor case 8 includes a cylindrical body 10 and a lid-shaped cap 11 fixed to one end (left end in FIG. 1) of the body 10. The body 10 is provided with a connection 12 to which the cap 11 is attached at one end of the body 10. The connection 12 integrally supports the cap 11 by fitting a part of the cap 11 inside.

The cap 11 has a first cylindrical part 13 internally fitted into the body 10 and a second cylindrical part 14 covering the bus bars 7. The first cylindrical part 13 has a groove 13a formed in an annular shape along a peripheral direction on an outer peripheral surface of the first cylindrical part 13. An O-ring as a sealing member 15 is disposed in the groove 13a. The second cylindrical part 14 has an annular protrusion 16 protruding in an inner diameter direction on an inner peripheral surface of the second cylindrical part 14. Bus bars 7 are inserted inside the annular protrusion 16. An O-ring as a sealing member 17 is disposed between the annular protrusion 16 and the holder 9.

The driving force transmission mechanism 3 includes a gear mechanism.

That is, the driving force transmission mechanism 3 includes a drive gear 18 on a drive side, a driven gear 19 on a driven side that meshes with the drive gear 18, and a gear case 20 that accommodates the gears 18 and 19.

The drive gear 18 is a small-diameter gear having fewer teeth than the driven gear 19, and is attached so as to rotate integrally with the output shaft 6a of the electric motor 6. On the other hand, the driven gear 19 is a large-diameter gear having more teeth than the drive gear 18, and is attached so as to rotate integrally with a part of the motion conversion mechanism 4.

Further, the drive gear 18 is rotatably supported by two pairs of bearings 21 and 22 at both ends of the drive gear 18 in an axial direction of the drive gear 18. Of the two pairs of bearings 21 and 22, one pair of bearings 21 (on the left in FIG. 1) is held by being fitted into a cylindrical bearing holding member 23 fixed to an end of the electric motor 6. The other pair of bearings 22 (on the right in FIG. 1) is held by being fitted into the gear case 20. Further, the driven gear 19 is fixed to a part of the motion conversion mechanism 4, and is rotatably supported by a double-row bearing 24.

The double-row bearing 24 is accommodated in a cylindrical sleeve 25 provided in the gear case 20, and an axial movement of the double-row bearing 24 is restricted by a retaining ring 26 attached to the inner peripheral surface of the sleeve 25. As the double-row bearing 24, a double-row angular contact ball bearing capable of supporting an axial load in addition to a radial load is used.

When the electric motor 6 starts driving and the output shaft 6a rotates, the drive gear 18 rotates integrally with the output shaft 6a, and the driven gear 19 rotates in conjunction with this rotation. At this time, the rotary motion from the electric motor 6 is transmitted from the drive gear 18 having fewer teeth to the driven gear 19 having more teeth, which reduces speed and increases a rotational torque. In this way, by increasing the rotational torque by decelerating between the drive gear 18 and the driven gear 19 and outputting the rotational torque, a sufficient output can be obtained by using a small electric motor. Note that, unlike the present embodiment, the drive gear 18 and the driven gear 19 may be configured with gears having the same number of teeth, and the rotary motion from the electric motor 6 may be transmitted without deceleration.

The gear case 20 is configured as a partition wall partitioning an accommodation space of the gears 18 and 19 of the driving force transmission mechanism 3. The gear case 20 includes a first connection 27 connected to the motor case 8 and a second connection 28 connected to the motion conversion mechanism 4. The first connection 27 is formed on one surface (hereinafter referred to as "first surface") 20a of the gear case 20, and the second connection 28 is formed on the other surface (hereinafter referred to as "second surface") 20b of the gear case 20. The first connection 27 and the second connection 28 are grooves formed in an annular shape.

The motion conversion mechanism 4 is a ball screw mechanism including a nut 29 as a rotating member, a screw shaft 30 capable of a linear motion, and multiple balls 31. Further, the motion conversion mechanism 4 includes a shaft case 32 accommodating the screw shaft 30.

Spiral grooves 33a and 33b are formed on an inner peripheral surface of the nut 29 and an outer peripheral surface of the screw shaft 30, and the balls 31 are rollably accommodated between the spiral grooves 33a 33b. Further, the nut 29 is provided with a circulation member (not shown), and the balls 31 are configured to circulate along the spiral grooves 33a and 33b by the circulation member. The driven gear 19 is fixed to an outer peripheral surface of the nut 29. Further, the outer peripheral surface of the nut 29 is supported by the double-row bearing 24. As a result, the nut 29 is configured to rotate integrally with the driven gear 19.

The screw shaft 30 is inserted through an inner periphery of the nut 29 and is disposed parallel to the output shaft 6a of the electric motor 6. A connection hole 30a is provided at a front end (left end in FIG. 1) of the screw shaft 30, and by inserting a fastener such as a bolt into the connection hole 30a, the screw shaft 30 and a corresponding part of an apparatus as an operation target (not shown) are connected to each other.

In response to transmission of the rotary motion of the output shaft 6a of the electric motor 6 to the nut 29 via the drive gear 18 and the driven gear 19, the nut 29 rotates to move the screw shaft 30 in one axial direction (forward or backward). On the contrary, when the output shaft 6a rotates in a reverse direction, the rotary motion is transmitted to the nut 29 via the drive gear 18 and the driven gear 19 to move the screw shaft 30 to the other axial direction. In this way, a forward or reverse rotary motion of the electric motor 6 is converted into a linear motion (forward or backward) of the screw shaft 30 parallel to the output shaft 6a, and thus an operation target connected to the front end of the screw shaft 30 is operated.

The shaft case 32 includes a base 34 overlapping the gear case 20, and a shaft accommodation part 35 that accommodates the screw shaft 30. The base 34 has an annular protrusion 36 that fits into the second connection 28 formed on a second surface 20b of the gear case 20. The annular protrusion 36 is configured as an annular protruding part so as to correspond to an annular shape of the second connection 28 (groove). A part of the screw shaft 30 is accommodated in the shaft accommodation part 35, the annular protrusion 36 is fitted to the second connection 28, and the base 34 is fixed (connected) to the gear case 20 by a fastener 37. Thus, the shaft case 32 closes an accommodation space of the driving force transmission mechanism 3 and the motion conversion mechanism 4.

The base 34 has a recess 34a that engages with an end 25a of the sleeve 25 of the motion conversion mechanism 4. The recess 34a is configured by an annular recess corresponding to the annular shape of the sleeve 25. The end 25a of the sleeve 25 is inserted into the recess 34a, but does not contact a bottom surface of the recess 34a. Thus, a gap is formed between the recess 34a and the end 25a of the sleeve 25. This gap communicates the accommodation space of the motion conversion mechanism 4 with the ventilation section 5. Thus, the gap becomes an air passage connecting the motion conversion mechanism 4 and the ventilation section 5. Further, this gap functions as a labyrinth seal part S that prevents intrusion of a lubricant (oil, grease, or the like) used for the screw shaft 30 of the motion conversion mechanism 4, splashed toward the ventilation section 5 when the end 25a of the sleeve 25 is inserted into the recess 34a. This configuration is not limited to the above configuration. The end 25a of the sleeve 25 may be brought into contact with the bottom surface of the recess 34a. The accommodation space of the motion conversion mechanism 4 communicates with the accommodation space of the driving force transmission mechanism 3. It is therefore possible to ventilate the motion conversion mechanism 4 through the accommodation space of the ventilation section 5 and the driving force transmission mechanism 3.

The shaft accommodation part 35 has a cylindrical shape protruding from the base 34. The shaft accommodation part 35 has a guide groove 35a guiding the screw shaft 30 on an inner surface of the shaft accommodation part 35. The guide groove 35a includes a pair of grooves formed along a longitudinal direction of the shaft accommodation part 35. A detent pin 38 is provided at a rear end of the screw shaft 30 as a rotation restricting member that restricts a rotation of the screw shaft 30. The detent pin 38 is attached to the screw shaft 30 in a direction orthogonal to or intersecting the axial direction of the screw shaft 30. Guide rollers 39 are rotatably attached to both ends of the detent pin 38 protruding from the rear end of the screw shaft 30 in an outer diameter direction. Each guide roller 39 is engaged with the guide groove 35a of the shaft accommodation part 35. In response to the axial movement of the guide roller 39 along the guide groove 35a, the screw shaft 30 moves forward or backward in the axial direction without rotating in the peripheral direction.

On the outer peripheral surface of the screw shaft 30, a magnet 40 serving as a sensor target detecting an axial position of the screw shaft 30 is provided. Meanwhile, a stroke sensor (not shown) is provided on an outer periphery of the motor case 8. When the screw shaft 30 moves forward or backward, the stroke sensor detects a change in a magnetic field (for example, a direction and strength of a magnetic flux density) of the magnet 40 that moves in accordance with the movement of the screw shaft 30. Thus, an axial position of the magnet 40 and the axial position of the screw shaft 30 are detected.

Further, a boot 41 preventing foreign matter from entering the electric actuator 1 and a boot cover 42 protecting the boot 41 are provided on the screw shaft 30. The boot 41 has a small-diameter end 41a, a large-diameter end 41b, and bellows 41c connecting the small-diameter end 41a and the large-diameter end 41b and expanding and contracting in the axial direction. The small-diameter end 41a is fixed to the outer peripheral surface of the screw shaft 30, and the large-diameter end 41b is fixed to an outer peripheral surface of a cylindrical boot attachment member 43 attached to the boot cover 42. The boot attachment member 43 has a groove 43a having an annular shape on the outer peripheral surface of the boot attachment member 43. An O-ring as a sealing member 44 is disposed in the groove 43a.

The boot cover 42 is disposed to cover the outside of the boot 41, and is integrally molded with the body 10 of the motor case 8. An annular protrusion 45 that fits into the first connection 27 formed on the first surface 20a of the gear case 20 is disposed at one end of the boot cover 42 and the body 10. The annular protrusion 45 is configured as an annular protruding part so as to correspond to the annular shape of the first connection 27 (groove). By fitting the annular protrusion 45 to the first connection 27 and fixing the body 10 and the boot cover 42 to the gear case 20 with a fastener such as s bolt, the body 10, the boot cover 42, and the gear case 20 can be airtightly connected.

As described above, the motor case 8, the gear case 20, the shaft case 32, the boot 41, and the boot cover 42 are connected by the sealing members 15, 17, 44, and 66, the connections 27 and 28, and the annular protrusions 36 and 45, and thus the electric actuator 1 includes a closed space inside. Due to this structure, the electric actuator 1 is ventilated only by the ventilation section 5.

The ventilation section 5 mainly includes an air flow path 46 formed between the shaft case 32 and the gear case 20, a ventilation unit 47 attached to the shaft case 32, and an attachment part 48 integrally molded on the shaft case 32.

Figure 3:
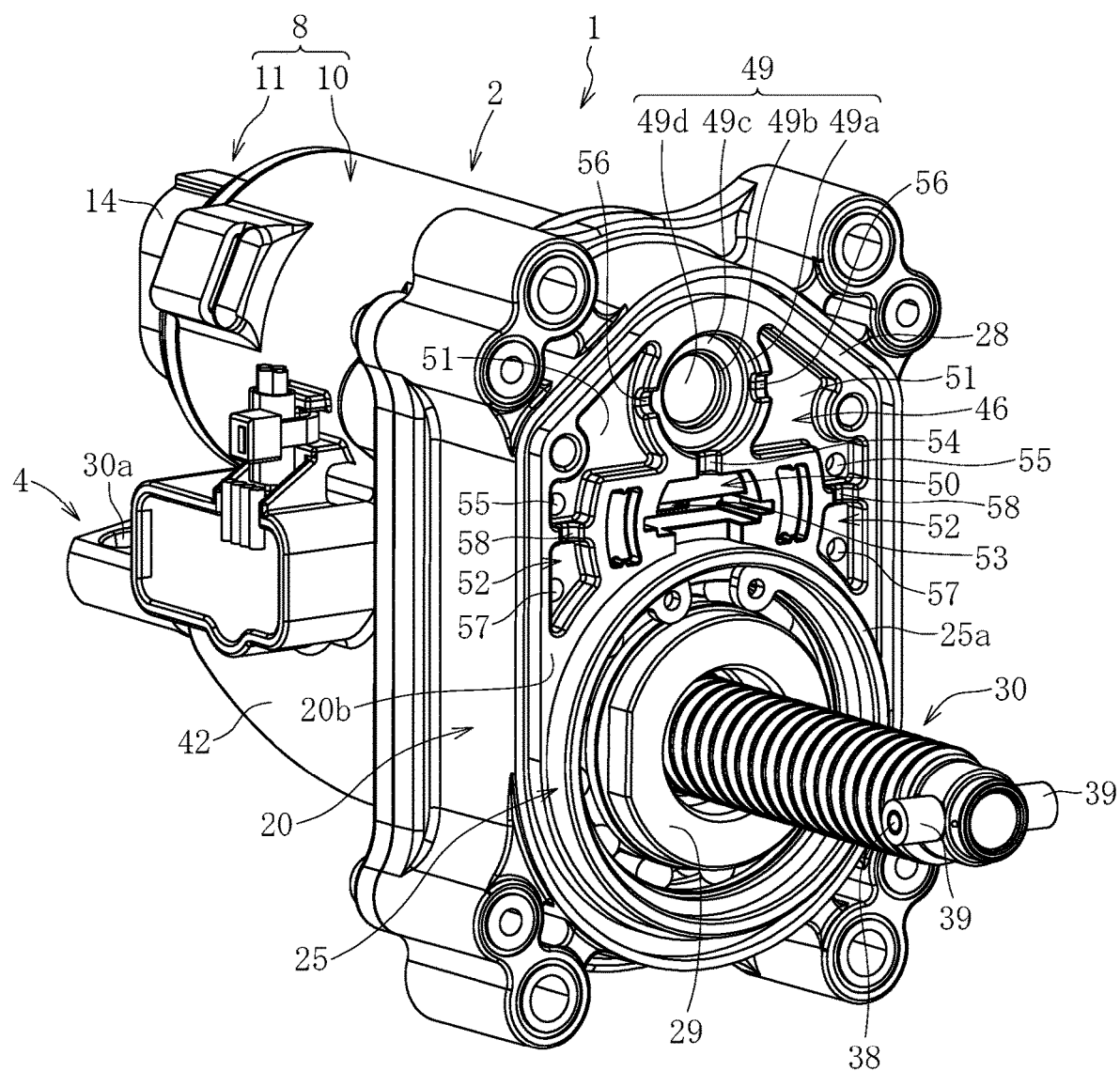
FIG. 3 is a perspective view showing the electric actuator with the shaft case removed.
Figure 4:
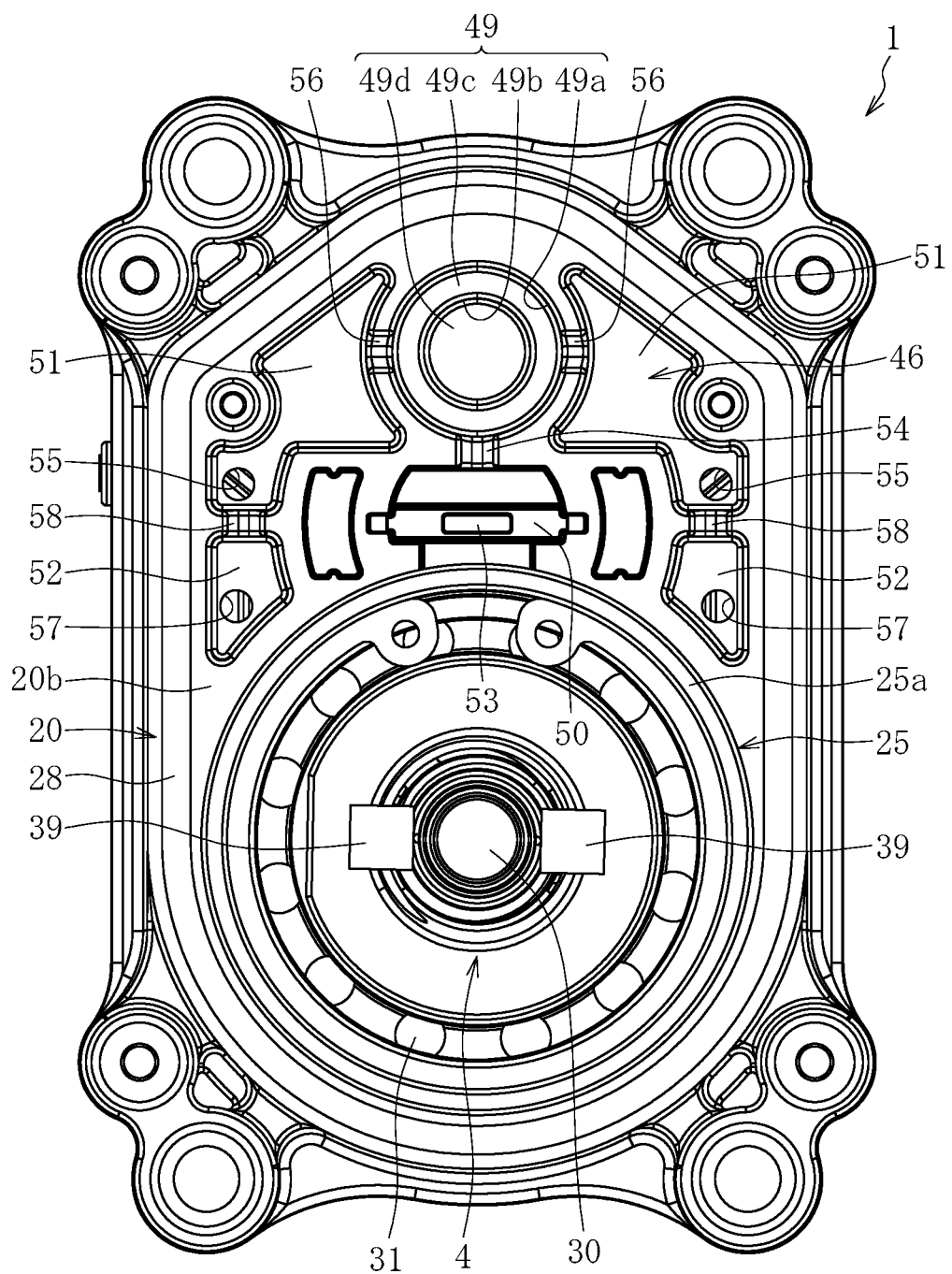
FIG. 4 is a front view showing the electric actuator with the shaft case removed.

As shown in FIGS. 3 and 4, the second surface 20b of the gear case 20 has a plurality of recesses 49 to 52 configuring the air flow path 46. The recesses 49 to 52 are a first recess 49 facing the ventilation unit 47, a second recess 50 formed below the first recess 49, and two third recesses 51 adjacent to each other to the left and right of the first recess 49, and two fourth recesses 52 formed below the third recesses 51.

The first recess 49 is formed so as to be located above the screw shaft 30. Further, the first recess 49 is formed at a position overlapping the drive gear 18 in a horizontal direction. The first recess 49 has a circular shape in a front view. Specifically, the first recess 49 has a large-diameter first side wall 49a and a small-diameter second side wall 49b. Further, the first recess 49 has an annular first bottom 49c formed between the first side wall 49a and the second side wall 49b, and a circular second bottom 49d formed at a position deeper than the first bottom 49c.

The second recess 50 has a first vent 53 that penetrates the gear case 20 at a bottom of the second recess 50. The first vent 53 has a rectangular shape, but is not limited to this shape. A first groove 54 that communicates the second recess 50 and the first recess 49 is formed between the second recess 50 and the first recess 49. The first groove 54 is formed linearly along a vertical direction. A depth of the first groove 54 is shallower than a depth of the first recess 49 and the second recess 50. Further, the second recess 50 communicates with the labyrinth seal part S of the motion conversion mechanism 4.

Each third recess 51 has a second vent 55 penetrating the gear case 20 at a bottom of each third recess 51. The second vent 55 has a circular shape, but is not limited to this shape. A second groove 56 is formed between each third recess 51 and the first recess 49 to communicate each third recess 51 and the first recess 49. The second groove 56 is formed linearly along the horizontal direction orthogonal to an axial direction of the screw shaft 30 of the motion conversion mechanism 4. In other words, the second groove 56 is formed along a direction orthogonal to a direction in which the first groove 54 is formed. A depth of the second groove 56 is shallower than the depth of the first recess 49 and the third recesses 51.

The fourth recesses 52 are formed below the third recesses 51. Each fourth recess 52 has a third vent 57 that penetrates the gear case 20 at a bottom of each fourth recess 52. The third vent 57 has a circular shape, but is not limited to this shape. A third groove 58 is formed between each fourth recess 52 and each third recess 51 to communicate each fourth recess 52 and each third recess 51. The third groove 58 is formed linearly along the vertical direction. That is, the third groove 58 is formed parallel to the first groove 54 and is formed in a direction orthogonal to the second groove 56. A depth of the third groove 58 is shallower than the depth of the third recesses 51 and the fourth recesses 52.

Figure 5:
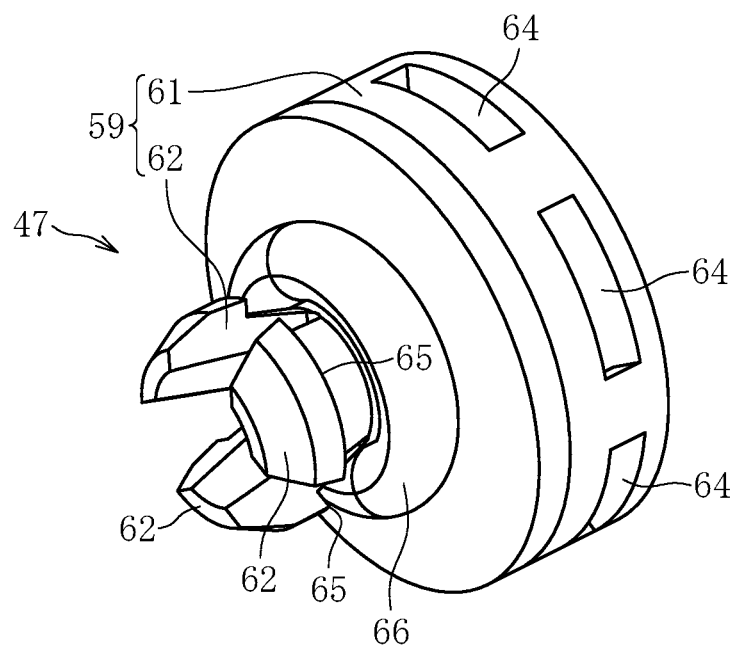
FIG. 5 is a perspective view of a ventilation unit.
Figure 6:
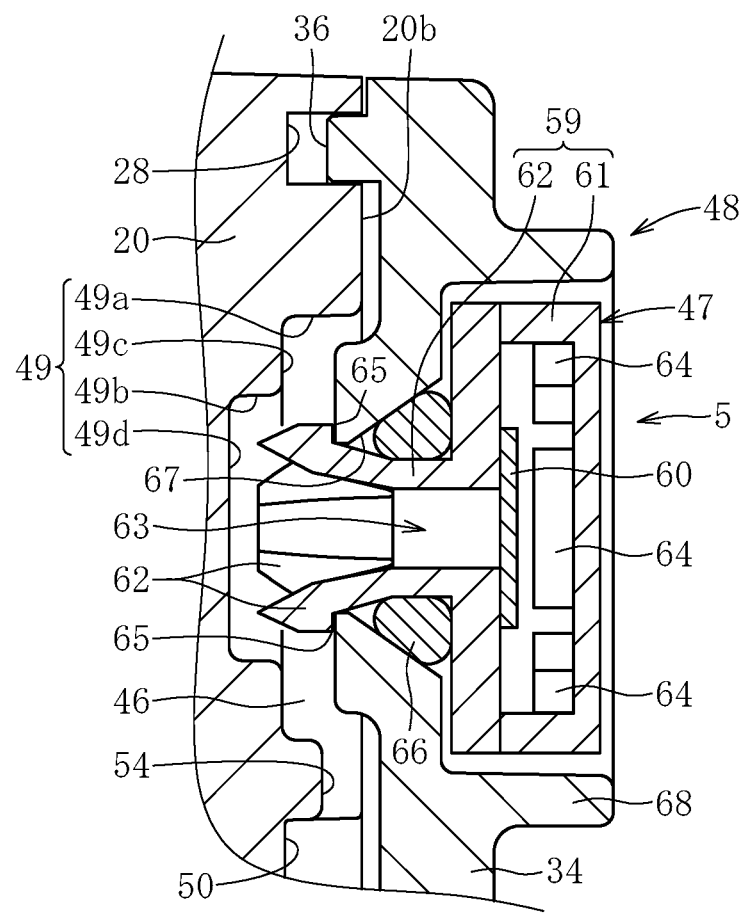
FIG. 6 is a vertical sectional view of the ventilation unit.

As shown in FIGS. 5 and 6, the ventilation unit 47 includes a filter housing 59 attached to the attachment part 48 and a filter 60 accommodated inside the filter housing 59.

The filter housing 59 includes resin and is provided with the cylindrical body 61 and a plurality of (three in an example of the drawing) claws 62 that engages with the attachment part 48. The body 61 has a first vent 63 and second vents 64 circulating the air inside. The first vent 63 is a hole that penetrates one end (end surface) of the body 61. The first vent 63 is formed at a base of the claws 62. The second vents 64 are a plurality of holes penetrating through an outer peripheral surface of the body 61. The second vents 64 are formed at intervals in a circumferential direction of the body 61. Each of the second vents 64 is formed in a long and rectangular shape along the circumferential direction of the body 61.

Each claw 62 is an elastically deformable protrusion that protrudes from one end of the body 61. Each claw 62 is formed so as to surround a periphery of the first vent 63 of the body 61. Each claw 62 has a locking protrusion 65 that is locked in the shaft case 32 at a tip of each claw 62. An O-ring as a sealing member 66 is attached to the outer periphery of the base of the claws 62.

The filter 60 is disposed between the first vent 63 and the second vents 64 in the body 61. As shown in FIG. 6, the filter 60 is disposed inside the body 61 so as to close the first vent 63. The filter 60 is configured by a resin sheet capable of allowing the air to pass through. The filter 60 may be configured by a water-repellent material (for example, a fluorine-based resin). The filter 60 may be disposed such that a surface of the filter 60 (filter surface) is along the vertical direction (up and down direction). In other words, the surface of the filter 60 is disposed so as to face the horizontal direction (the axial direction of the screw shaft 30). In the present embodiment, the "vertical direction" means a direction in which gravity acts.

The attachment part 48 is formed on the base 34 at a position apart from the shaft accommodation part 35. As shown in FIG. 6, the attachment part 48 has an attachment hole 67 penetrating the base 34 of the shaft case 32, and a cylindrical part 68 formed so as to surround the body 61 of the filter housing 59.

The attachment hole 67 is formed at a position facing the first recess 49 formed on the second surface 20b of the gear case 20. Each claw 62 of the ventilation unit 47 is inserted into the attachment hole 67. On an inner surface of the shaft case 32, the claws 62 fix the filter housing 59 to the shaft case 32 by hooking the locking protrusion 65 on an edge of the attachment hole 67. In this state, the sealing member 66 attached to the claws 62 is in close contact with an outer surface of the shaft case 32 and seals the attachment hole 67.

The cylindrical part 68 has a cylindrical shape having a larger inner diameter than an outer diameter of the filter housing 59 (body 61). Thus, in a state where the body 61 is accommodated inside the cylindrical part 68, a gap is formed between the outer peripheral surface of the body 61 and an inner peripheral surface of the cylindrical part 68. This gap configures a flow path for the air to flow through the second vents 64. In addition, this gap configures a labyrinth seal and prevents foreign matter from entering the second vents 64. A tip of the cylindrical part 68 protrudes outward from the end surface of the body 61. Thus, the ventilation section 5 does not protrude from an end of the cylindrical part 68. This prevents other parts from contacting the body 61 in a device incorporating the electric actuator 1.

With the ventilation unit 47 attached to the attachment part 48, the tip of each claws 62 is located between the second surface 20b of the gear case 20 and the base 34 of the shaft case 32. Specifically, the tip of each claw 62 has been inserted into the first recess 49. In this state, as shown in FIG. 6, the first recess 49 is not in contact with the claws 62, and a gap is formed between the first recess 49 and the tip of each claw 62. As a result, a space through which the air can flow is secured around the claws 62 (first recess 49) in the air flow path 46.

Next, an operation mode of the electric actuator 1 having the above configuration will be described.

As shown in FIG. 1, the screw shaft 30 is in a standby position and is in a most backward position. Thus, the boot 41 is in a most contracted state. In response to a rotation of the output shaft 6a of the electric motor 6, the driving force transmission mechanism 3 operates to transmit the driving force to the motion conversion mechanism 4. The rotary motion of the output shaft 6a is converted into the linear motion of the screw shaft 30 by a rotation of the nut 29. As a result, the screw shaft 30 moves forward from the standby position. At this time, the boot 41 extends as the screw shaft 30 moves.

In this case, a negative pressure is generated inside the electric actuator 1, and the air flows into the body 61 of the filter housing 59 through the second vents 64 of the ventilation section 5. After passing through the filter 60, the inflowing air flows into the air flow path 46 from the first vent 63.

After that, the air flows from the first recess 49 of the air flow path 46 to the second recess 50, to the fourth recesses 52. Further, the air flows through the vents 53, 55, and 57 and the labyrinth seal part S of the motion conversion mechanism 4 into the electric actuator 1, that is, an internal space (closed space) closed by the motor case 8, the gear case 20, the shaft case 32, the boot 41, and the boot cover 42. As a result, an internal pressure of the electric actuator 1 is adjusted to be constant.

On the other hand, when the screw shaft 30 that has moved forward from the standby position moves backward, the boot 41 contracts accordingly. At this time, an internal space of the electric actuator 1 is pressurized (positive pressure) due to the contraction of the boot 41. In this case, the air occupying the internal space of the electric actuator 1 flows out of the vents 53, 55, and 57 of the gear case 20 and the labyrinth seal part S of the motion conversion mechanism 4, and flows toward the ventilation unit 47 through the air flow path 46 between the gear case 20 and the shaft case 32. After that, the air flows from the first vent 63 into the body 61 of the filter housing 59. This air passes through the filter 60 and is discharged from the second vents 64. As a result, an internal pressure of the electric actuator 1 is adjusted to be constant.

In the electric actuator 1 according to the above present embodiment, when the boot 41 expands and contracts with the movement of the screw shaft 30, the air is circulated inside and outside the electric actuator 1 through the ventilation section 5. Thus, the internal pressure of the electric actuator 1 can be suitably adjusted. As a result, a stroke of the screw shaft 30 can be set as large as possible. Further, the ventilation section 5 provided with the ventilation unit 47 (filter 60) makes it possible to prevent foreign matter from entering the electric actuator 1.

The gear case 20 of the driving force transmission mechanism 3 functions as a partition wall partitioning the accommodation space of the drive unit 2, the driving force transmission mechanism 3, and the motion conversion mechanism 4, and the air flow path 46 of the ventilation section 5 in the electric actuator 1. That is, the gear case 20 as a partition wall prevents the lubricant (oil or grease) used in the driving force transmission mechanism 3 from scattering, and partitions the driving force transmission mechanism 3 such that the lubricant stays in the gear mechanism. Further, the gear case 20 partitions the air flow path 46 so as to regulate a flow of air in the air flow path 46 of the ventilation section 5.

The air flow path 46 of the ventilation section 5 is formed between the gear case 20 (first case) as the partition wall and the shaft case 32 (second case) of the motion conversion mechanism 4. As a result, when the air flow path 46 discharges the air in the internal space of the electric actuator 1, the air flow path 46 is a detour (labyrinth structure) such that the oil (spray) derived from the lubricant (oil or grease) included in the air does not reach the ventilation unit 47. That is, the first recess 49 facing the ventilation unit 47 does not have a vent, and isolates the ventilation unit 47 from the gear mechanism (drive gear 18).

Thus, the air occupying the internal space of the electric actuator 1 flows into the air flow path 46 through the vents 53, 55, and 57 located below the ventilation unit 47, and moves from the second recess 50 to the first recess 49, or moves upward from the fourth recesses 52 and the third recesses 51 to the first recess 49. In this way, the air flow path 46 can leave the oil included in the air in the recesses 49 to 52 in a process of the air rising from the vents 53, 55, and 57 to the first recess 49. As a result, the oil-free air is guided to the ventilation unit 47.

Further, the grooves 54, 56, and 58, which are a part of the air flow path 46, each configure a bottleneck having a smaller flow path sectional area than the recesses 49 to 52. Therefore, a flow rate of the air rising in the air flow path 46 is regulated when the air flows into the grooves 54, 56, and 58. At this time, the air contacts wall surfaces of the second recess 50 to the fourth recesses 52 near the grooves 54, 56, and 58, thereby adhering oil to the wall surfaces. As a result, the air flow path 46 can suitably remove oil from the air.

In addition, the second groove 56 located above the third groove 58 is formed along the horizontal direction orthogonal to the third groove 58. With this configuration, the air flow path 46 bypasses the air raised through the fourth recesses 52 and the third recesses 51 in the horizontal direction through the second groove 56. In this way, the air flow path 46 can effectively remove oil from the air by bypassing the air.

Further, the air flowing from the second recess 50 and the third recesses 51 into the first recess 49 is guided from the first bottom 49c to the second bottom 49d, bypasses the claws 62 of the ventilation unit 47 located in the first recess 49, and flows into the first vent 63. In this way, the first recess 49 and the claws 62 function as means for bypassing air.

Further, because the surface (filter surface) of the filter 60 is disposed along the vertical direction, the filter 60 has a structure in which foreign matter is less likely to adhere as compared with a case where the filter 60 is disposed along the horizontal direction. That is, when contacting the surface, foreign matter is likely to fall from the filter surface due to its own weight. Further, the ventilation unit 47 (filter 60), which is provided on the base 34 at a position apart from and above the screw shaft 30 (shaft accommodation part 35), can prevent the lubricant used for the screw shaft 30 from adhering to the filter 60. Further, the ventilation unit 47 is in a position to be most unlikely to be flooded even if the electric actuator 1 is submerged.

The motion conversion mechanism 4 communicates with the ventilation section 5 via the labyrinth seal part S, and thus can be ventilated. In addition, even if the lubricant used for the screw shaft 30 is scattered, the splashed lubricant can be prevented from entering the air flow path 46 of the ventilation section 5.

The present invention is not limited to the configuration of the above embodiment, or is not limited to the above action and effect. The present invention can be modified in various ways without departing from the gist of the present invention.

In the above embodiment, the air flow path 46 having the first recess 49 to the fourth recesses 52 has been illustrated. However, the number of recesses configuring the air flow path 46 is not limited to the above embodiment. Similarly, the number of grooves 54, 56, and 58 and the number of vents 53, 55, and 57 configuring the air flow path 46 are not limited to the above embodiment.

In the above embodiment, the screw shaft 30 of the motion conversion mechanism 4 is disposed along the horizontal direction orthogonal to the vertical direction, but the present invention is not limited to this configuration. The screw shaft 30 can be disposed in any posture and at any angle.

In the above embodiment, an example is shown in which the internal space of the electric actuator 1 is a closed space via the sealing members 15, 17, 44, and 66, but the present invention is not limited to this configuration. The present invention is also applicable to the electric actuator 1 assembled without using a sealing member. That is, the internal space of the electric actuator 1 does not have to be an airtight space or a waterproof space. The present invention can be applied to various electric actuators 1 having an accommodation space in which the boot 41 can be deformed by a pressure change due to the movement of the screw shaft 30 without using the ventilation section 5.

In the above embodiment, an example in which a plurality of recesses 49 to 52 of the air flow path 46 is formed in the gear case 20 is shown, but the present invention is not limited to this configuration. The plurality of recesses and grooves configuring the air flow path 46 may be formed in the shaft case 32 (base 34).

REFERENCE SIGNS LIST

1 Electric actuator
2 Drive unit
3 Driving force transmission mechanism
4 Motion conversion mechanism
5 Ventilation section
6a Output shaft
20 Gear case (first case)
30 Screw shaft
32 Shaft case (second case)
34 Base
35 Shaft accommodation part
41 Boot
46 Air flow path
49 First recess
50 Second recess
51 Third recess
52 Fourth recess
53 First vent
55 Second vent
57 Third vent
60 Filter
S Labyrinth seal part

The invention claimed is:

1. An electric actuator comprising:
a drive unit having an output shaft that is rotatable;
a motion conversion mechanism configured to convert a rotary motion of the output shaft into a linear motion;
a driving force transmission mechanism configured to transmit a driving force of the drive unit to the motion conversion mechanism;
an accommodation space accommodating the drive unit, the motion conversion mechanism, and the driving force transmission mechanism;
a ventilation section configured to ventilate the accommodation space in accordance with an operation of the motion conversion mechanism, the ventilation section including a vent penetrating a partition wall partitioning the driving force transmission mechanism, an air flow path communicating with the vent, and a filter;
a first case accommodating the driving force transmission mechanism and having the partition wall and the vent; and
a second case holding the filter, wherein
the first case and the second case are overlapped and connected,
the air flow path is disposed between the first case and the second case,
the motion conversion mechanism includes a screw shaft capable of linear motion and a boot configured to expand and contract in response to a movement of the screw shaft,
the second case is a shaft case accommodating the screw shaft,
the shaft case includes a base and a shaft accommodation part accommodating the screw shaft, and
the filter is disposed at the base at a position apart from the shaft accommodation part.

2. The electric actuator according to claim 1, wherein the motion conversion mechanism includes a labyrinth seal part communicating with the ventilation section.

3. The electric actuator according to claim 1, wherein the air flow path includes a plurality of recesses disposed in at least one of the first case or the second case.

4. The electric actuator according to claim 3, wherein the motion conversion mechanism includes a labyrinth seal part communicating with the ventilation section.

5. The electric actuator according to claim 3, wherein the vent is a plurality of vents each penetrating the partition wall and being located on a bottom surface of one of the recesses disposed in the first case.

6. The electric actuator according to claim 5, wherein the motion conversion mechanism includes a labyrinth seal part communicating with the ventilation section.

7. An electric actuator comprising:
a drive unit having an output shaft that is rotatable;
a motion conversion mechanism configured to convert a rotary motion of the output shaft into a linear motion;
a driving force transmission mechanism configured to transmit a driving force of the drive unit to the motion conversion mechanism;
an accommodation space accommodating the drive unit, the motion conversion mechanism, and the driving force transmission mechanism; and
a ventilation section configured to ventilate the accommodation space in accordance with an operation of the motion conversion mechanism, the ventilation section including a vent penetrating a partition wall partitioning the driving force transmission mechanism, an air flow path communicating with the vent, and a filter,
wherein the motion conversion mechanism includes a labyrinth seal part communicating with the ventilation section.

* * * * *